(12) United States Patent
Reilly

(10) Patent No.: US 6,439,669 B1
(45) Date of Patent: Aug. 27, 2002

(54) FILAMENT GRIPPER

(75) Inventor: Patrick S. Reilly, Lisbon, IA (US)

(73) Assignee: Gillette Canada Company, Mississauga (CA)

( * ) Notice: Subject to any disclaimer, the term of this patent is extended or adjusted under 35 U.S.C. 154(b) by 0 days.

(21) Appl. No.: 09/386,879

(22) Filed: Aug. 31, 1999

(51) Int. Cl.⁷ .................................................. A46D 3/08
(52) U.S. Cl. .................................................. 300/2; 300/7
(58) Field of Search .............................. 300/2, 4, 5, 7, 300/10, 11

(56) References Cited

U.S. PATENT DOCUMENTS

| | | |
|---|---|---|
| 2,015,326 A | 9/1935 | Steidle |
| 2,187,791 A | 1/1940 | Lipps |
| 4,609,228 A | 9/1986 | Bickel |
| 4,688,857 A | 8/1987 | Boucherie |
| 4,697,851 A | 10/1987 | Takahashi |
| 4,884,849 A | 12/1989 | Shaw |
| 5,148,568 A | 9/1992 | Bojar et al. |
| 5,176,427 A | * 1/1993 | Weihrauch |
| 5,221,123 A | 6/1993 | Klinkhammer |
| 5,533,791 A | 7/1996 | Boucherie |
| 5,690,394 A | * 11/1997 | Bouchherie |
| 5,728,408 A | 3/1998 | Boucherie |
| 5,823,633 A | 10/1998 | Weihrauch |

FOREIGN PATENT DOCUMENTS

| | | |
|---|---|---|
| DE | 2308399 | 8/1974 |
| EP | 972465 A1 | 7/1999 |
| GB | 247688 | 2/1926 |

* cited by examiner

Primary Examiner—Randall E. Chin
(74) Attorney, Agent, or Firm—David A. Howley

(57) ABSTRACT

A gripper includes a) a first element that includes a plurality of male components; and b) a second element that includes a plurality of female components dimensioned to receive the male components. The first element and the second element are moveable from an open position to a closed position and the male components engage the female components when the elements are in a closed position. The individual male components and the individual female components are capable of maintaining a plurality of bristles in fixed relation to each other when the elements are in a closed position.

24 Claims, 10 Drawing Sheets

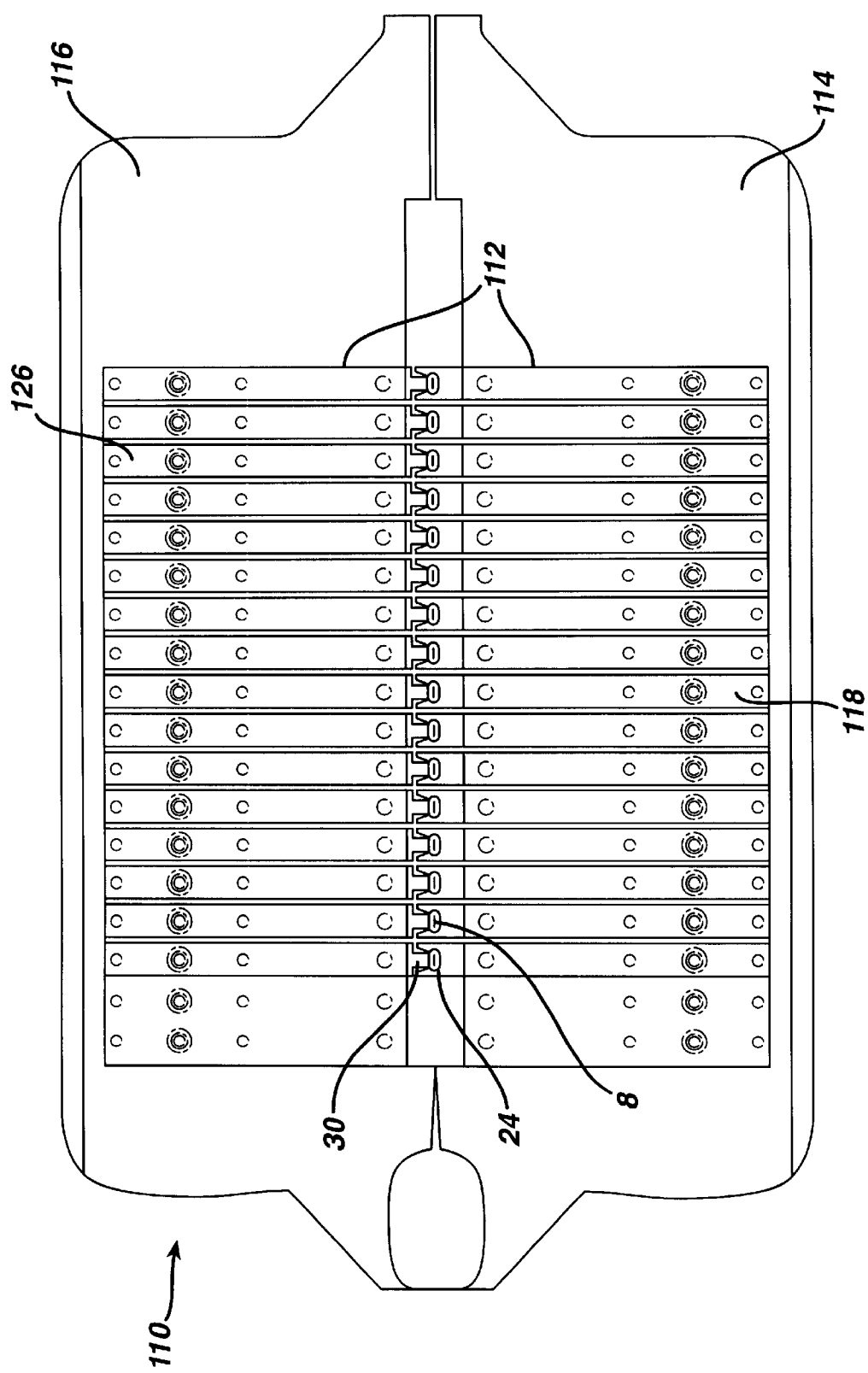

FILAMENT GRIPPER

BACKGROUND OF THE INVENTION

The invention relates to gripping filaments.

Oral brushes, e.g., toothbrushes, often include a handle, a head and tufts of bristles extending from the head.

The bristles of the oral brush are often made from filaments. In some oral brush manufacturing processes filaments are provided in the form of a hank that is circular in cross section, has a height ranging from a few centimeters to several meters, and includes a band around its circumference. The band holds the filaments together.

Prior to incorporation into the oral brush, the hanks, and thus the filaments, are cut to a length of a few centimeters. The band is then removed and the filaments can be transferred to a magazine for further processing. Once the band is removed these short filaments become very difficult to handle.

SUMMARY OF THE INVENTION

In one aspect, the invention features a gripper that includes a) a first element that includes a plurality of male components, and b) a second element that includes a plurality of female components dimensioned to receive the male components. The first element and the second element are moveable from an open position to a closed position; the male components engage the female components when the elements are in a closed position. The individual male components and the individual female components are capable of maintaining a plurality of bristles in fixed relation to each other when the elements are in a closed position. In one embodiment, the female component or the male component is spring loaded. In another embodiment, the gripper further includes a spring extending from one of the first element or the second element to one of the female component or the male component. In one embodiment, the spring exerts a force against the female component in the direction of the male component. In other embodiments, the gripper further includes a means for biasing one of the female component or the male component against the other of the female component or the male component.

In some embodiments, the female components are removable from the second element. In other embodiments, the male components are removable from the first element. In some embodiments, the male components are removable from the first element, and the female components are removable from the second element.

In other embodiments, the gripper further includes a transport connected to the gripper. In one embodiment, the transport is capable of moving the gripper from a first position to a second position. In some embodiments, the transport is capable of rotating the gripper. In another embodiment, the female components include an entrance defined by a first side wall, a second side wall, and a seat disposed between the first side wall and the second side wall. In one embodiment, the first side wall includes a tapered surface. In other embodiments, the second side wall includes a tapered surface.

In another embodiment, the male components include a finger. In one embodiment, the male components include a finger, a first guide member extending from the finger, and a second guide member extending from the finger.

In some embodiments, the gripper is automated. In other embodiments, the male components and the female components are capable of maintaining a plurality of tufts of bristles having two unfused ends in fixed relation to each other. In another embodiment, the male components and the female components are capable of maintaining a plurality of tufts of bristles in fixed relation to each other where the tufts have a fused end.

In another aspect, the invention features a method of transferring a plurality of tufts of bristles using an above-described automated gripper. The method includes 1) closing the elements of the gripper such that a plurality of tufts of bristles are maintained in fixed relation to each other between the male components and the female components of the gripper, and 2) moving the gripper. In one embodiment, the method further includes releasing the tufts of bristles. In some embodiments, the step of releasing includes placing individual tufts of bristles in openings in an article, e.g., a carrier bar or a mold insert. In other embodiments, the step of moving the gripper includes moving the gripper from a first position to a second position.

In other aspects, the invention features a gripper holding bristles that includes a first element, a second element, and a plurality of tufts of bristles having two unfused ends. The gripper maintains the tufts in fixed relation to each other between the first element and the second element. In one embodiment, the first element includes a male component. In other embodiments, the second element includes a female component.

In another aspect, the invention features a method for transporting tufts of bristles having two unfused ends, the method includes gripping a plurality of tufts of bristles having two unfused ends such that the tufts are maintained in a fixed relation to each other, and moving the plurality of tufts.

In other aspects, the invention features a bristle processing system that includes 1) a station that includes a plurality of tufts of bristles, and 2) an automated gripper for gripping the tufts, where the gripper includes a) a first element that includes a plurality of male components, and b) a second element that includes a plurality of female components dimensioned to receive the male components, the first element and the second element being moveable from an open position to a closed position, wherein the male components engage the female components when the elements are in a closed position. The individual male components and the individual female components are capable of maintaining the tufts of bristles in fixed relation to each other when the elements are in a closed position.

In one embodiment, the bristle processing system further includes a fusing apparatus that includes a heat source, where the fusing apparatus is capable of fusing the ends of the bristles to form fused tufts of bristles.

In another aspect, the invention features a method of processing a plurality of tufts of unfused bristles. The method includes 1) gripping a plurality of tufts of bristles having two unfused ends between a first element and a second element of an automated gripper, 2) transporting the tufts of unfused bristles in fixed relation to each other, and 3) releasing the tufts of unfused bristles. In one embodiment, the method further includes fusing one of the ends of the tufts of bristles.

The grippers can be used to grip and transport a number of tufts of bristles simultaneously. The grippers can also simultaneously shape a number of tufts.

The male and female components that constitute the gripper elements can be removable from the gripper. If a male component or a female component becomes damaged and needs replacing, the entire gripper remains useful because the individual component can be removed and replaced with a functioning component. In addition, the gripper can include any number of gripper elements (i.e., male and female component pairs), which enables the gripper to be constructed to simultaneously grip a desired number of tufts of bristles. The gripper can be modified as needed to include any number of gripper elements and any type of gripper element (e.g., gripper elements defining various tuft shapes and more than one tuft shape on a single gripper).

One of the male component or the female component can also be spring loaded such that it is biased toward the other component. The bias allows the gripper to comply with the variances that are inherent in simultaneously gripping multiple tufts that include multiple bristles. Such variances include, e.g., variances that influence the cross-sectional dimension of the tuft including, e.g., a variance in the number of bristles in the tuft or a variance in the diameters of the bristles within the tuft.

The grippers are useful for transferring tufts of bristles from and to stations were the bristles undergo processes including, e.g., end rounding, fusing, cutting, and tufting.

Other features and advantages of the invention will be apparent from the following description of the preferred embodiments thereof, and from the claims.

BRIEF DESCRIPTION OF DRAWINGS

FIG. 8 is a top view of a gripper according to a second embodiment of the invention.

DETAILED DESCRIPTION

Figure 1:
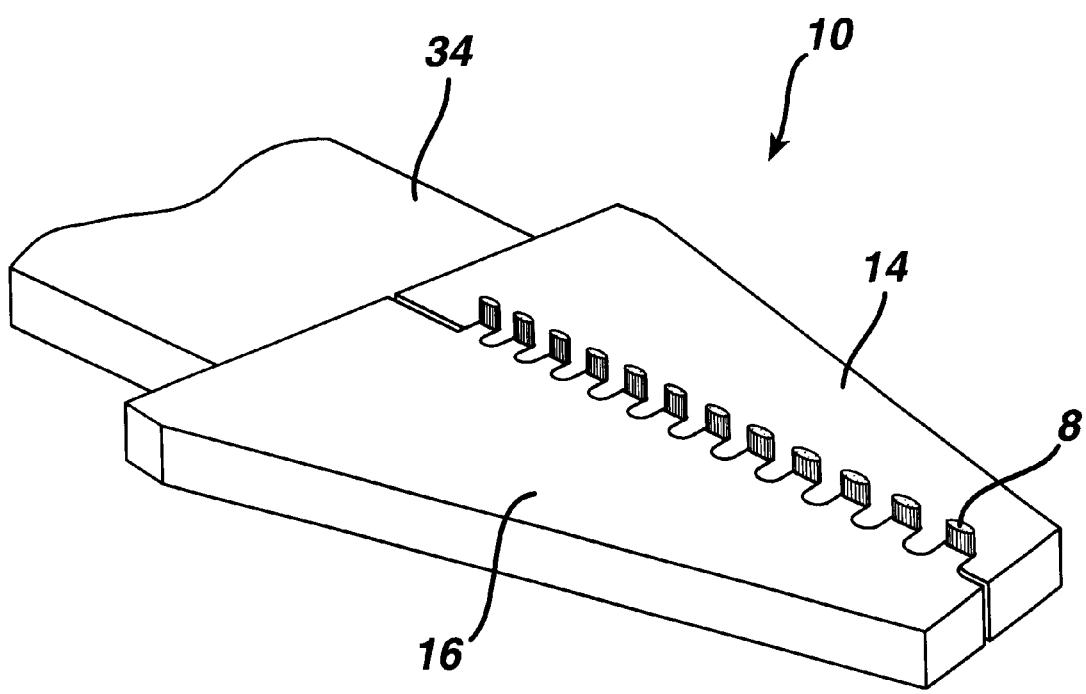
FIG. 1 is a perspective top view of tufts of bristles held by a gripper.
Figure 2:
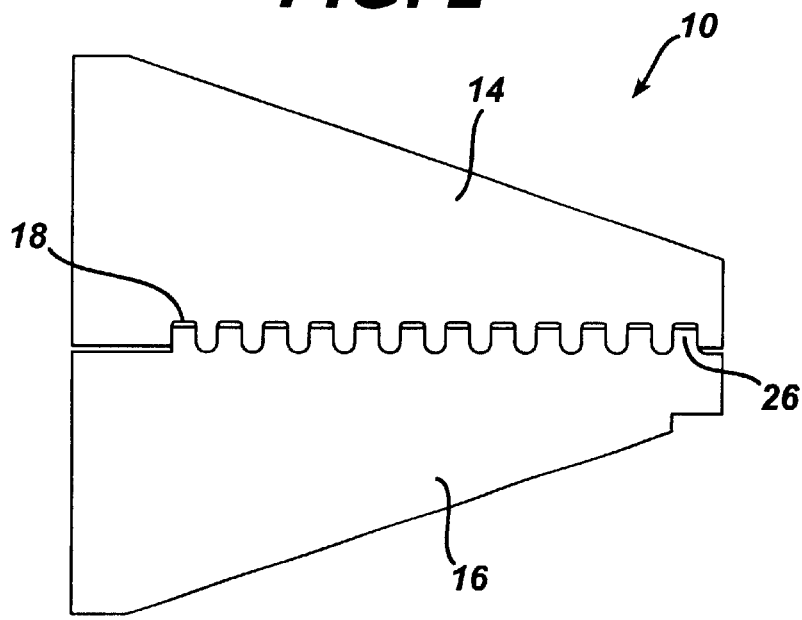
FIG. 2 is a top view of the gripper of FIG. 1 with the tufts of bristles removed.
Figure 3:
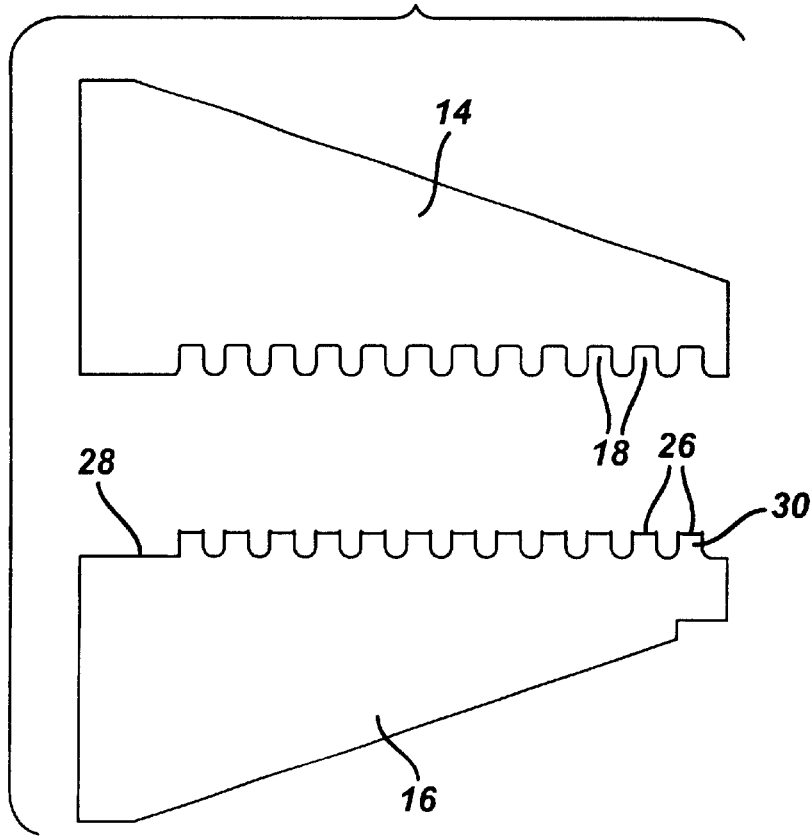
FIG. 3 is a top view of the gripper of FIG. 2 in an open position.
Figure 4:
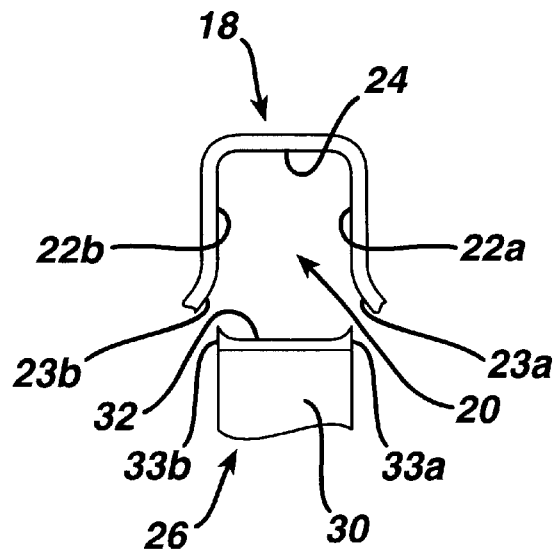
FIG. 4 is an enlarged view of the female component and male component of the gripper of FIG. 1.
Figure 5:
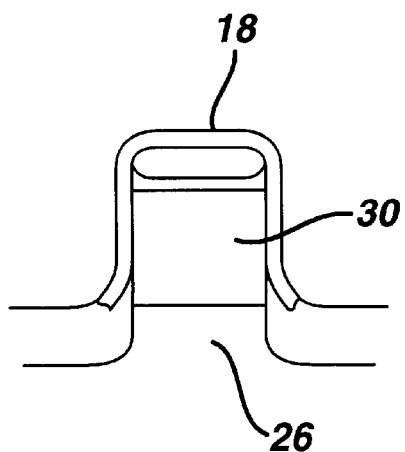
FIG. 5 is a top view of the male component engaged with a female component of the gripper of FIG. 1.
Figure 6:
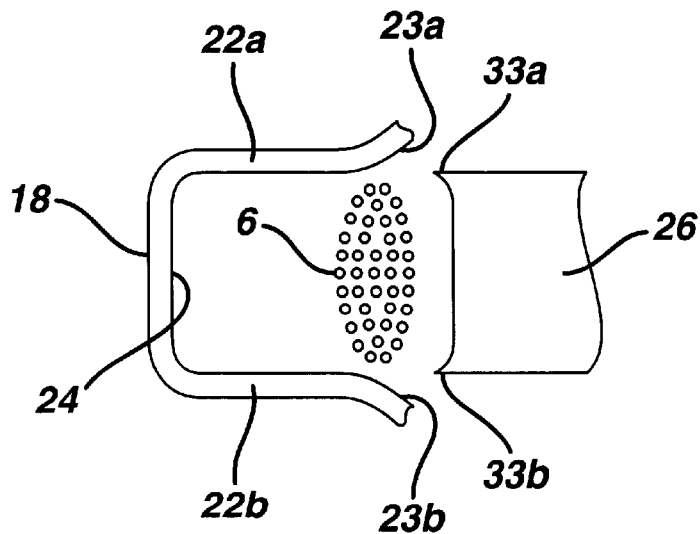
FIGS. 6 and 6A are top views of the bristles located at two positions between a male component and a female component.
Figure 6A:
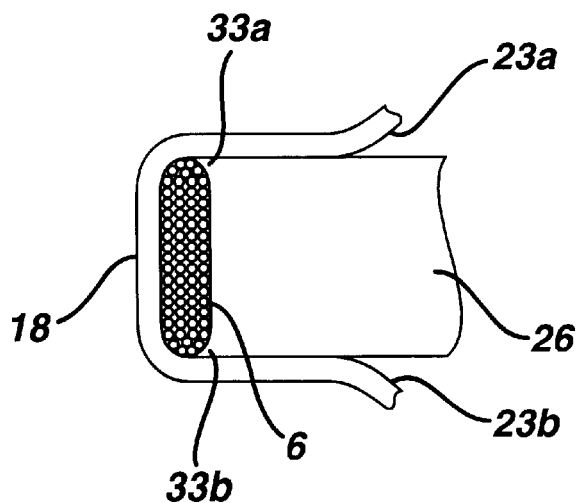

Referring to FIGS. 1–6, gripper 10 includes two gripper elements, e.g., jaws 14, 16, arranged in a plane and capable of moving from a first open position to a second closed position. In the closed position, gripper 10 is capable of gripping a number of tufts 8 of bristles 6, where the tufts 8 of bristles include fused ends, unfused ends or combination thereof.

Jaw 14 includes a number of female components 18 that include an entrance 20, defined by side walls 22a, 22b and seat 24. The side walls 22a, 22b preferably include tapered ends 23a, 23b to guide bristles 6 of tuft 8 toward seat 24 of female component 18. The female component is dimensioned to accommodate the tuft and preferably is dimensioned to define at least a portion the shape of the tuft. Examples of useful shapes defined by female component 18 include v-shaped, square, rectangular, circular, elliptical, oval, and step shaped.

Jaw 16 includes a number of male components 26 extending from a surface 28 of jaw 16. Male components 26 include a finger 30 dimensioned to fit within female components 18. Finger 30 includes a bristle contacting end 32 and preferably includes guide members 33a, 33b that assist in guiding bristles 6 into female component 18. Bristle contacting end 32 and guide members 33a, 33b can also assist in shaping tuft 8. The male component 26 can also include a foot 35 extending from the finger 30. The foot 35 can be dimensioned to assist in shaping the tuft 8.

The gripper 10 includes a means 34 that moves the gripper jaws 14, 16 from an open position to a closed position. Examples of useful gripper moving means include actuators, e.g., pneumatic, electric, and hydraulic actuators, cams, and links. As gripper 10 closes jaws 14, 16 move toward each other, and male components 26 and female components 18 engage each other, and male component 26 passes into female component 18 a predetermined distance. As male component 26 slides into entrance 20 of female component 18, male component 26 presses bristles 6 against seat 24 of female component 18 such that bristles 6 become sandwiched between (i.e., gripped by) male component 26 and female component 18.

The bristles 6 are held in position (i.e., gripped) by the male 26 and female 18 components with a force sufficient to maintain the bristles in the gripper 10. When the gripper 10 opens, the gripper jaws 14, 16 separate and the tufts 8 are released or are available for release from the gripper 10.

Figure 9A:
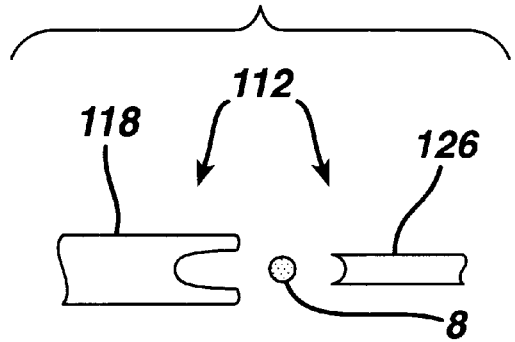
FIGS. 9A–C are enlarged views of bristles located at various positions between the male component and the female component of the gripper of FIG. 8.
Figure 9B:
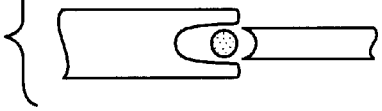
Figure 9C:
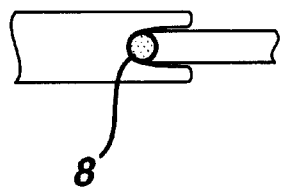

Referring to FIGS. 8–9, gripper 110 includes a number of gripper pairs 112 each of which includes a female component 118 attached to a first gripper jaw 114 and a male component 126 attached to a second gripper jaw 116. Gripper pairs 112 are removably attached to jaws 114, 116 and can be attached to or removed from jaws 114, 116 as desired. Preferably the gripper pairs 112 are attached to the jaws 114, 116 by a fastener. The fastener feature can be realized by, e.g., screw, dowel pin, clamp, rivet, solder, and combinations thereof.

Figure 10:
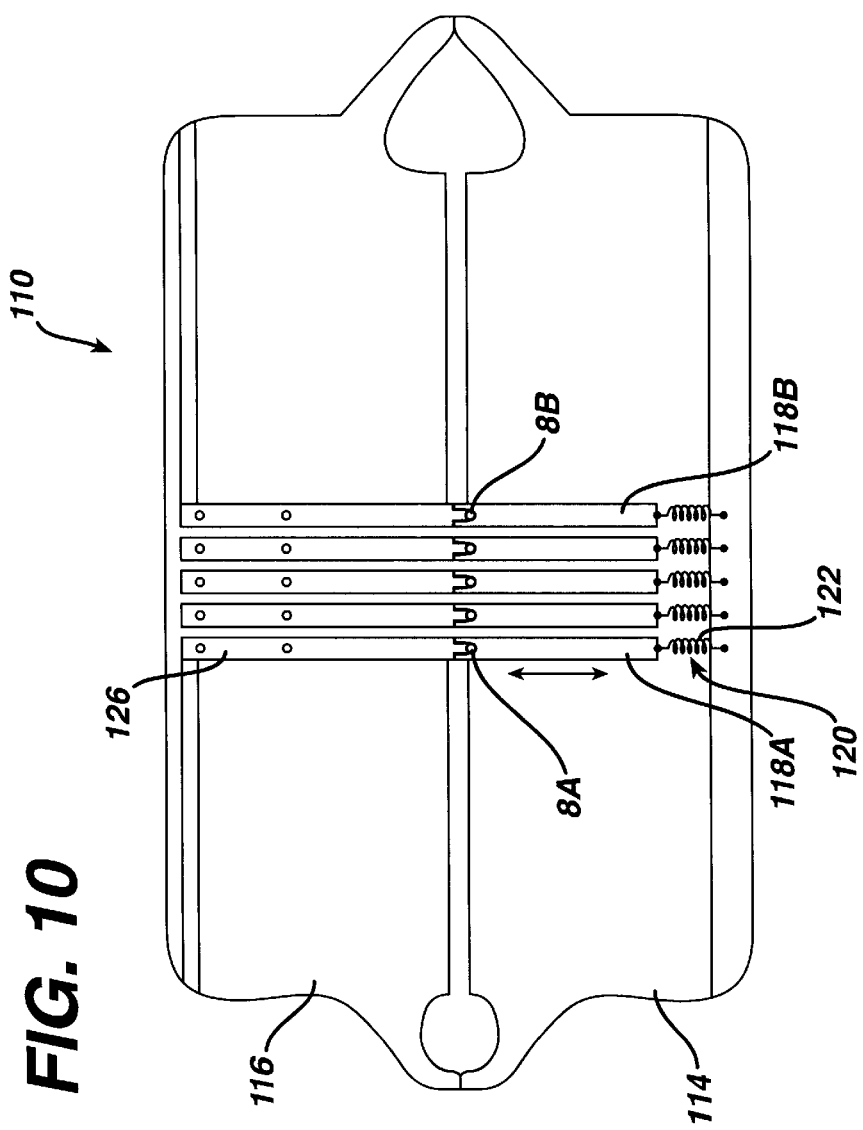
FIG. 10 is a top view of a spring loaded gripper according to a third embodiment of the invention.
Figure 12:
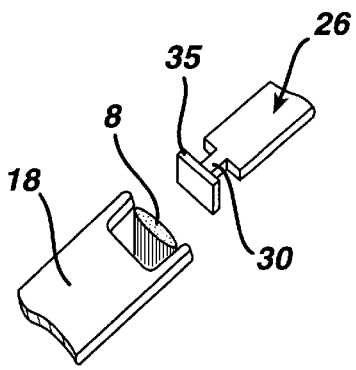
FIG. 12 is a perspective top view of a second embodiment of a male component and a female component of the gripper.

Referring to FIG. 10, female component 118 is preferably attached to jaw 114 with a spring loaded mechanism 120. The spring loaded feature can be realized by, e.g., coil spring, torsion spring, gas spring, e.g., air spring, and elastomer spring. Spring 122 of spring loaded mechanism 120 biases female component 118 in the direction of male component 126 and allows female component 118 to move along a linear path when a sufficient force is exerted on female component 118 in a direction opposing the force of spring 120. When male component 126 and female component 118 come together to grip a tuft 8 that is larger than a predetermined dimension, the force exerted by male component 126 and the dimension of tuft 8 causes female component 118 to press against spring 122, which causes spring 122 to compress. By displacing female component 118, gripper pairs 112 are able to adjust for variances that occur in the dimensions of the numerous tufts 8 that are being simultaneously gripped by gripper 110.

In FIG. 10, for example, each spring loaded female component 118 of the individual gripping pairs 112 on gripper 110 obtains a position that varies depending upon the dimension of the tuft being gripped. Relatively larger tuft 8A displaces spring loaded female component 118A to a greater extent relative to the displacement exhibited by spring loaded female component 8B that grips relatively smaller tuft 8B.

Figure 13A:
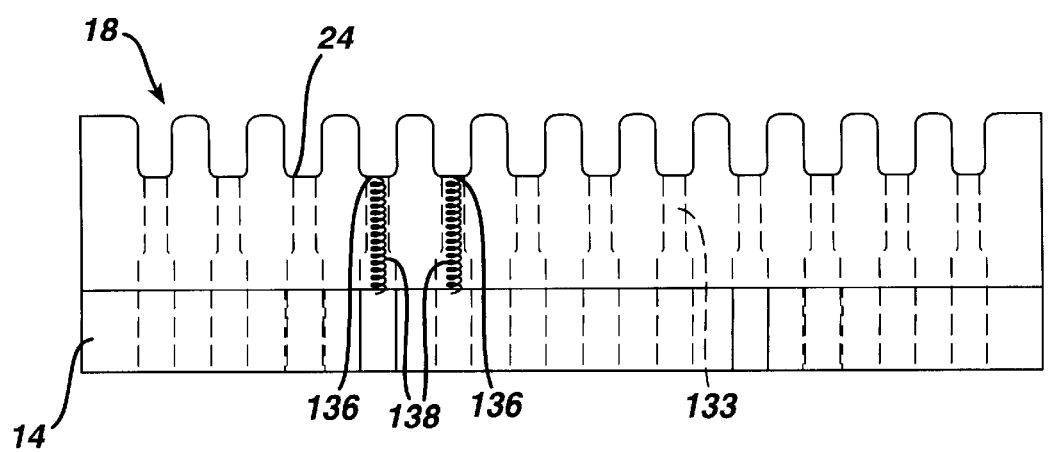
FIG. 13A is a cross sectional view of an embodiment of the gripper that includes a jaw that includes female components that include a spring loaded mechanism.
Figure 13B:
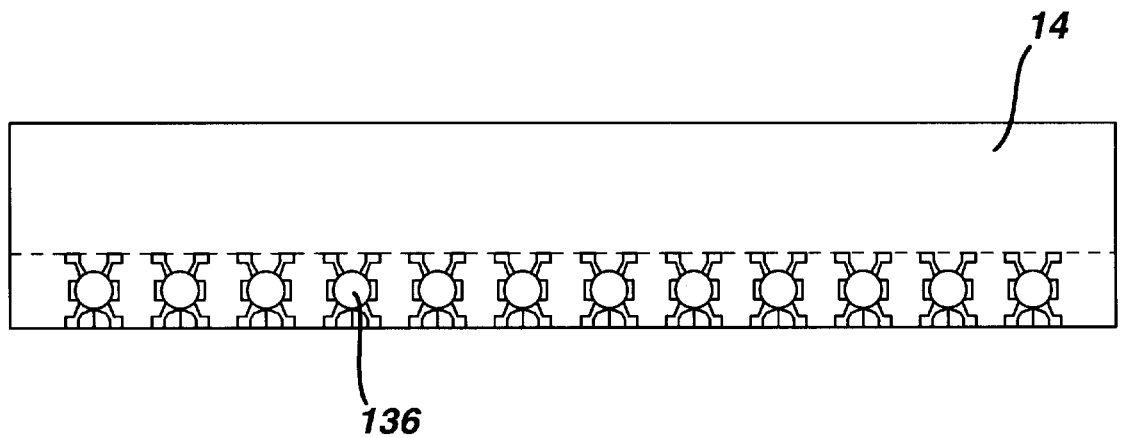
FIG. 13B is a top view of the bristle receiving surface of the female components of FIG. 13A.
Figure 13C:
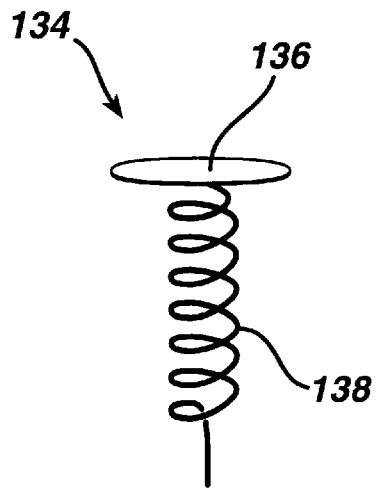
FIG. 13C is a side view of the spring loaded mechanism of FIG. 13A.

Referring to FIGS. 13A–C, a hole 133 exists below the seat 24 of the female component 18. A spring loaded mechanism 134 is positioned in the hole 133 located at the seat 24 of female component 18, which extends from jaw 14. The spring loaded mechanism 134 includes a spring 138 that is attached to jaw 14 at one end, and to a button 136 that defines at least a portion of the seat 24 of the female component 18 at a second end.

Gripper 10 is preferably attached to a transport 36 that is capable of moving the gripper 10 from one position to another position. Transport 36 can be constructed and programmed to move gripper 10 as desired including, e.g., translationally, rotationally, vibrationally, and combinations thereof. The transports feature can be realized by, e.g., actuators that are capable of moving the gripper. Examples of suitable actuators include pneumatic, mechanical, and electrical linear actuators and rotary actuators, and combinations thereof.

The gripper is useful in a variety of applications and in a variety of processes including, e.g., to pick and place bristles, to hold bristles while additional processing steps are conducted on the bristles, to transport bristles from one position to another, and combinations thereof.

In one application, the gripper picks bristles from a first station and places bristles at a second station. At each station a variety of processes can occur including, e.g., fusing, end rounding, shaping, cutting, trimming, tufting, and combinations thereof. Mechanisms for performing these processes are described, for example, in U.S. Pat. Nos. 5,927,819, and 5,224,763, which are incorporated herein.

Figure 7:
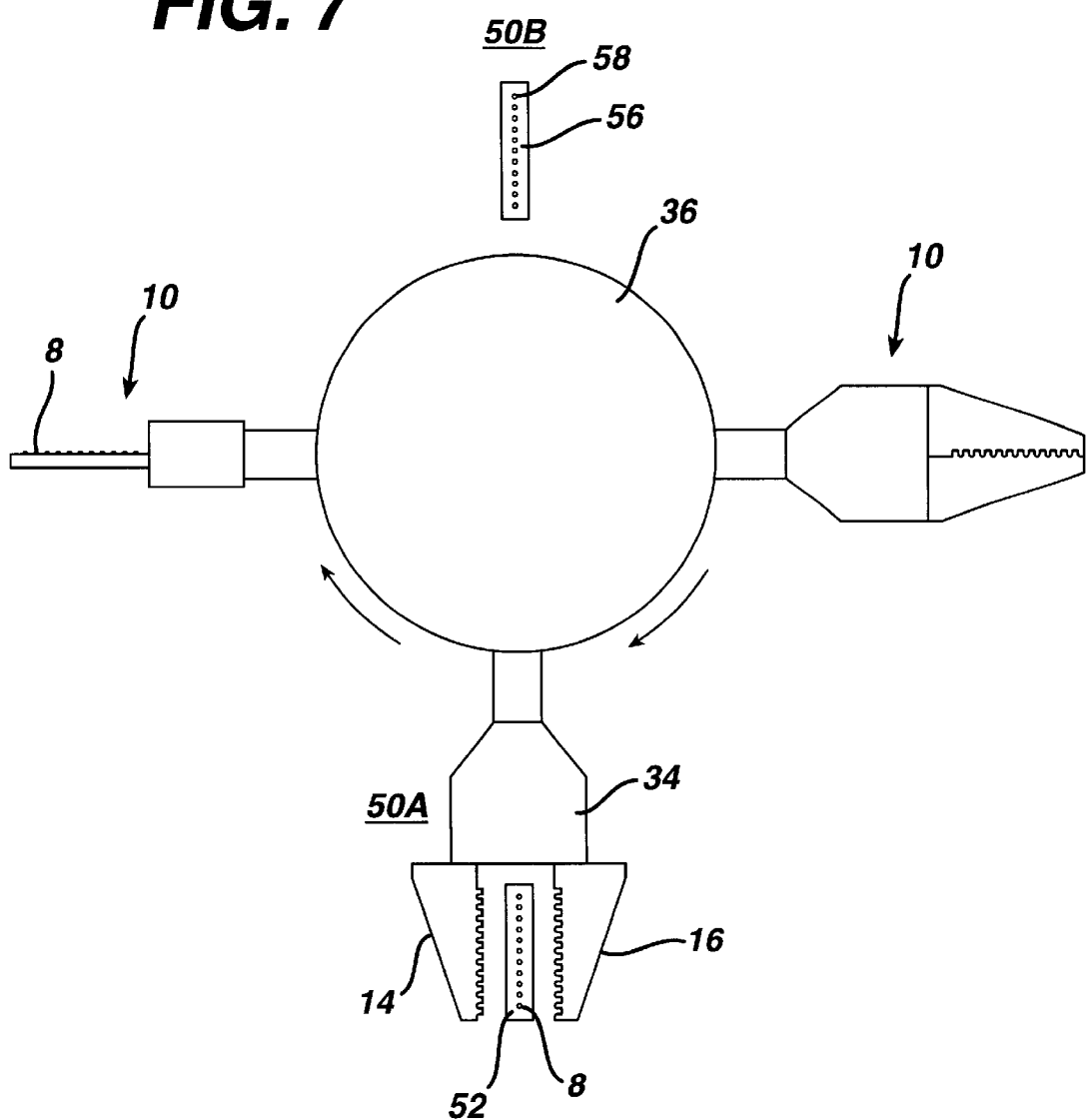
FIG. 7 is a top view of an indexer that includes three grippers.
Figure 7A:
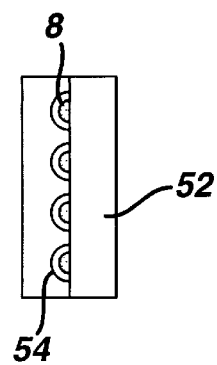
FIG. 7A is a top view of a picker bar.

Referring to FIG. 7, for example, gripper 10 is attached to transport 36 that is in the form of an indexer and is constructed to operate in a pick and place mode. Gripper 10 travels along the predetermined path of the indexer as it indexes from one station 50 to the next. When gripper 10 indexes to first station 50A, which includes tufts 8 of bristles 6 extending from openings 54 in a picker bar 52, gripper 10 opens, positions itself to grip tufts 8, and closes such that tufts 8 become sandwiched between jaws 14, 16. Gripper 10 then clears first station 50A, e.g., the gripper moves upward or picker bar 52 moves downward. Gripper 10 then transports tufts 8 to a second station 50B, e.g., a carrier bar 6 that includes blind holes 58. Gripper 10 can then place tufts 8 at second station 50B or hold tufts 8 while tufts 8 are subjected to a process.

Figure 11:
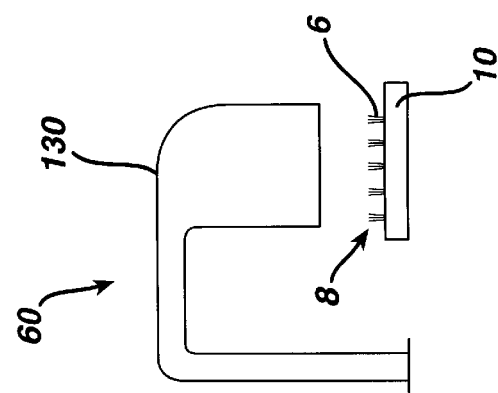
FIG. 11 is a side view of a fusing apparatus including the gripper of FIG. 8.

Referring to FIG. 11, in another application a fusing apparatus 60 includes gripper 110 and heat source 130. Carrier bar 132 filled with tufts 8 extending from blind holes 134 in the carrier bar 132 is positioned such that tufts 8 extend between female component 118 and male component 126 of gripper 110. Male components 126 and female components 118 of the gripper move toward tufts 8 of bristles 6. When female components 118 and male components 126 reach an intermediate position at which the tufts 8 are in contact with male components 126, gripper 110 pauses.

Heat source 130, e.g., heated compressed air, is then applied to the exposed ends of bristles 6 for a period sufficient to allow the ends of the bristles 6 to melt and fuse together. When male 126 and female 118 components are at the intermediate position bristles 6 disposed between the two components 118, 126 are spaced apart from each other, which allows heat to transfer down the length of bristles 6, which, in turn, exposes a greater extent of the bristles 6 to the heat, which increases the length of melt along the bristles. While the ends of the bristles 6 are still molten jaws 114, 116 move to the closed position such that male 126 and female 118 components press against bristles 6 to compress and shape tuft 8.

Heat source 130 is removed from bristles 6 and jaws 114, 116 are held in the closed position for a few seconds to allow bristles 6 to cool, which freezes the shape of the tuft 8. Heat source 130 can be removed after the bristle ends have melted, e.g., while male 126 and female 118 components are at the intermediate position, or after jaws 114, 116 have closed. The resulting fused tufts 8 are then available for transfer to another station for additional processing.

Other embodiments are within the claims. For example, the male components can also be spring loaded. A variety of bristles having a variety of dimensions and cross sectional shapes can be gripped by the gripper. The gripper is preferably capable of gripping tufts and bristles having a length of from about 0.005 in to about 2 in, and a cross sectional dimension of from about 0.004 in to about 0.500 in, more preferably from about 0.006 in to about 0.275 in.

What is claimed is:

1. A gripper comprising:
    a) a first element comprising a plurality of male components; and
    b) a second element comprising a plurality of female components dimensioned to receive said male components,
    said first element and said second element being moveable from an open position to a closed position, wherein said male components engage said female components when said elements are in a closed position,
    said individual male components and said individual female components being capable of maintaining a plurality of bristles in fixed relation to each other when said elements are in a closed position.

2. The gripper of claim 1, wherein one of said female component or said male component is spring loaded.

3. The gripper of claim 1, further comprising a spring extending from one of said first element or said second element to one of said female component or said male component.

4. The gripper of claim 3, wherein said spring exerts a force against the female component in the direction of the male component.

5. The gripper of claim 1, further comprising a means for biasing one of said female component or said male component against the other of said female component or said male component.

6. The gripper of claim 1, wherein said female components are removable from said second element.

7. The gripper of claim 1 wherein said male components are removable from said first element.

8. The gripper of claim 7, wherein said female components are removable from said second element.

9. The gripper of claim 1, further comprising a transport connected to said gripper.

10. The gripper of claim 9, wherein said transport is capable of moving said gripper from a first position to a second position.

11. The gripper of claim 9, wherein said transport is capable of rotating said gripper.

12. The gripper of claim 1, wherein said female components comprise an entrance defined by a first side wall, a second side wall and a seat disposed between said first side wall and said second side wall.

13. The gripper of claim 12, wherein said first side wall comprises a tapered surface.

14. The gripper of claim 13, wherein said second side wall comprises a tapered surface.

15. The gripper of claim 1, wherein said male components comprise a finger.

16. The gripper of claim 1, wherein said male components comprise a finger, a first guide member extending from said finger, and a second guide member extending from said finger.

17. The gripper of claim 1, wherein said gripper is automated.

18. The gripper of claim 1, wherein said male components and said female components are capable of maintaining a plurality of tufts of bristles having two unfused ends in fixed relation to each other.

19. The gripper of claim 1, wherein said male components and said female components are capable of maintaining a plurality of tufts of bristles in fixed relation to each other where said tufts have a fused end.

20. A gripper holding bristles comprising:

a first element comprising a male component;

a second element comprising a female component dimensioned to receive said male component, said first element and said second element being moveable from an open position to a closed position, wherein said male component engages said female component when said elements are in a closed position, said male component and said female component being capable of maintaining a plurality of bristles in fixed relation to each other when said elements are in a closed position.

21. The gripper of claim 20, wherein said male component comprises a finger.

22. The gripper of claim 20, wherein said female component comprises an entrance defined by a first side wall, a second side wall and a seat.

23. A bristle processing system comprising:

1) a station comprising a plurality of tufts of bristles; and 2) an automated gripper for gripping said tufts, said gripper comprising a) a first element comprising a plurality of male components; and b) a second element comprising a plurality of female components dimensioned to receive said male components, said first element and said second element being moveable from an open position to a closed position, wherein said male components engage said female components when said elements are in a closed position, said individual male components and said individual female components being capable of maintaining said tufts of bristles in fixed relation to each other when said elements are in a closed position.

24. The bristle processing system of claim 23, further comprising a fusing apparatus comprising a heat source, said fusing apparatus being capable of fusing the ends of said bristles to form fused tufts of bristles.

* * * * *